United States Patent
Stavely et al.

(10) Patent No.: US 7,834,923 B2
(45) Date of Patent: Nov. 16, 2010

(54) APPARATUS AND METHOD FOR PRODUCING AND STORING MULTIPLE VIDEO STREAMS

(75) Inventors: Donald J. Stavely, Windsor, CO (US); Robert P. Cazier, Fort Collins, CO (US); Amy E. Battles, Windsor, CO (US); James W. Owens, Fort Collins, CO (US); Daniel J. Byrne, Fort Collins, CO (US); Dan L. Dalton, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1925 days.

(21) Appl. No.: 10/389,731

(22) Filed: Mar. 13, 2003

(65) Prior Publication Data

US 2004/0179116 A1 Sep. 16, 2004

(51) Int. Cl.
*H04N 5/335* (2006.01)
(52) U.S. Cl. .................................... 348/308; 348/218.1

(58) Field of Classification Search ................. 348/308, 348/302, 218.1, 222.1, 311, 220.1, 208.7, 348/208.11; 396/421
See application file for complete search history.

(56) References Cited

U.S. PATENT DOCUMENTS

| | | | |
|---|---|---|---|
| 4,821,121 A | | 4/1989 | Beaulier |
| 5,005,083 A | * | 4/1991 | Grage et al. ................. 348/588 |
| 5,262,871 A | * | 11/1993 | Wilder et al. ............... 348/307 |
| 5,444,482 A | * | 8/1995 | Misawa et al. ........... 348/220.1 |
| 5,719,786 A | * | 2/1998 | Nelson et al. ................ 709/219 |
| 6,080,104 A | * | 6/2000 | Ozawa et al. ............... 600/180 |
| 6,359,649 B1 | * | 3/2002 | Suzuki ..................... 348/220.1 |
| 6,606,122 B1 | * | 8/2003 | Shaw et al. ................. 348/302 |
| 6,721,008 B2 | * | 4/2004 | Lee et al. .................... 348/302 |
| 6,839,452 B1 | * | 1/2005 | Yang et al. .................. 382/103 |
| 6,859,229 B1 | * | 2/2005 | Suda .......................... 348/273 |
| 7,106,374 B1 | * | 9/2006 | Bandera et al. ............. 348/308 |
| 2001/0028730 A1 | * | 10/2001 | Nahata ....................... 382/117 |
| 2002/0085219 A1 | * | 7/2002 | Ramamoorthy ............. 358/1.9 |
| 2003/0160874 A1 | * | 8/2003 | Kuroiwa .................. 348/220.1 |

* cited by examiner

*Primary Examiner*—Tuan Ho

(57) ABSTRACT

A digital imaging device produces and stores multiple video streams from a single imaging sensor array. The stored video streams may be post-processed using video editing software to create a combined video presentation.

20 Claims, 6 Drawing Sheets

APPARATUS AND METHOD FOR PRODUCING AND STORING MULTIPLE VIDEO STREAMS

FIELD OF THE INVENTION

The present invention relates generally to digital imaging and more specifically to digital still cameras and digital camcorders.

BACKGROUND OF THE INVENTION

Both digital camcorders and digital still cameras having a video mode produce a single digital video stream that may be readily edited and, if desired, stored on an optical medium such as a DVD. Some devices are also capable of operating in picture-in-picture (PIP) mode, in which an inset second view is embedded within a larger background view. In some devices, it is even possible to record video in this PIP mode. Thus, two different views of the scene are recorded simultaneously in a single video stream.

In some applications, however, it is advantageous to generate two or more different views as separate, independent video streams. Typically, this is accomplished through the use of multiple cameras. Using multiple cameras can be both expensive and cumbersome.

It is thus apparent that there is a need in the art for an improved apparatus and method for producing and storing multiple video streams.

SUMMARY OF THE INVENTION

A digital imaging device that produces and stores multiple video streams is provided. An associated method for capturing digital video in the digital imaging device is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Multiple video streams may be produced simultaneously in a digital imaging device by sampling multiple regions of a single imaging sensor array. Saving the multiple video streams in a memory provides a variety of post-production options. For example, portions of the video streams may be edited into a single combined video presentation, or two or more video streams may be combined in split-screen, picture-in-picture, or auto-fade fashion.

In a specific example, a parent records a child's piano recital using a digital camcorder. The digital camcorder produces and records two independent video streams simultaneously: (1) a wide-angle view showing the child playing the piano from 15 feet away and (2) a cropped view showing only the child's torso and hands at the keyboard. Since the two video streams are saved separately, video editing software may be used to create a single video presentation combining portions of both the wide-angle and close-up views for a more varied, interesting presentation. In some embodiments, this editing and combining of the two video streams may be performed manually using the video editing software. In other embodiments, the video editing software may automatically combine the two streams to create a single video stream. In automatically combining the two video streams, the video editing software may employ techniques well known in the art such as picture in picture, split screen, or auto-fade. In the case of auto-fade, for example, the video editing software may alternately fade between the first and second video streams at predetermined intervals.

Figure 1A:
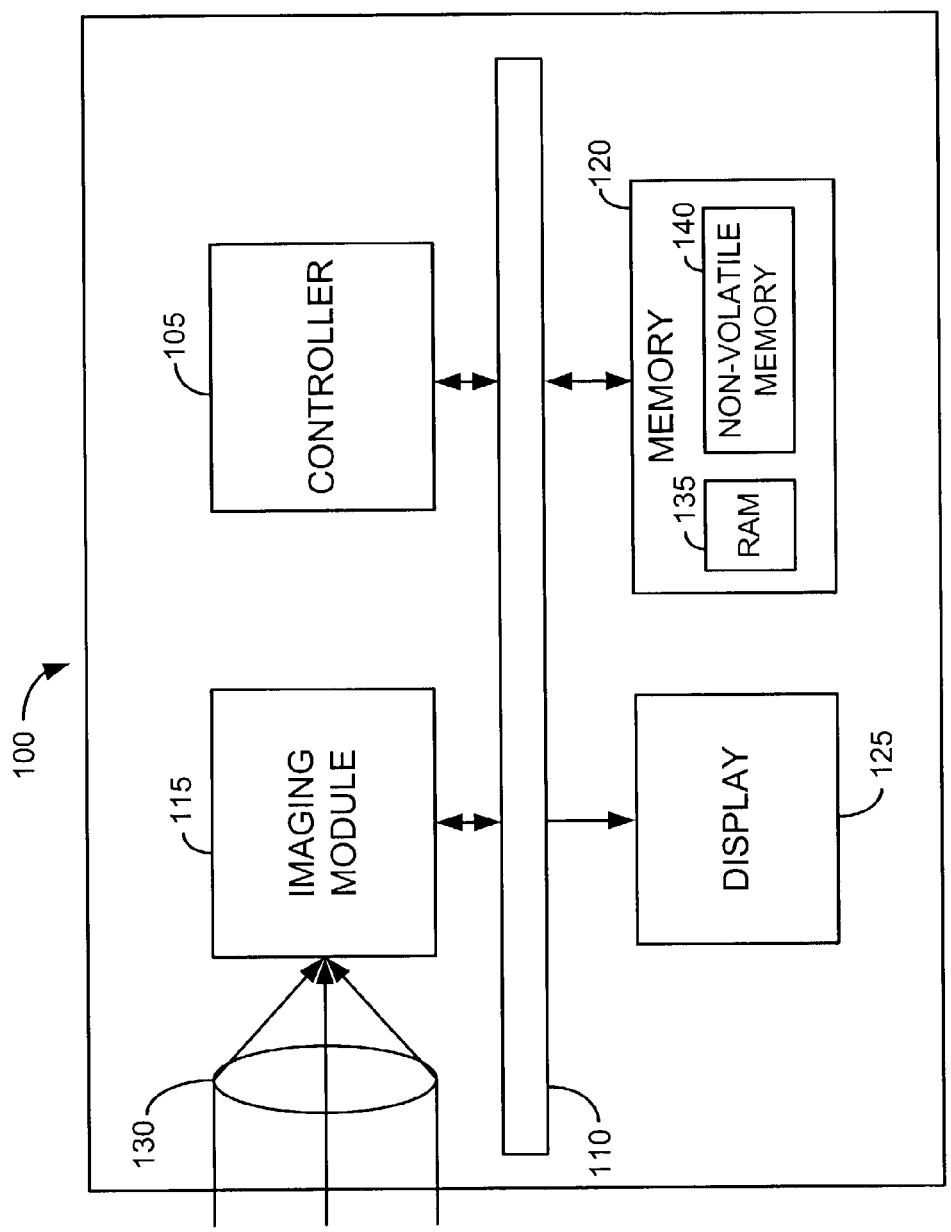
FIGS. 1A and 1B are functional block diagrams of a digital imaging device in accordance with an illustrative embodiment of the invention.
Figure 1B:
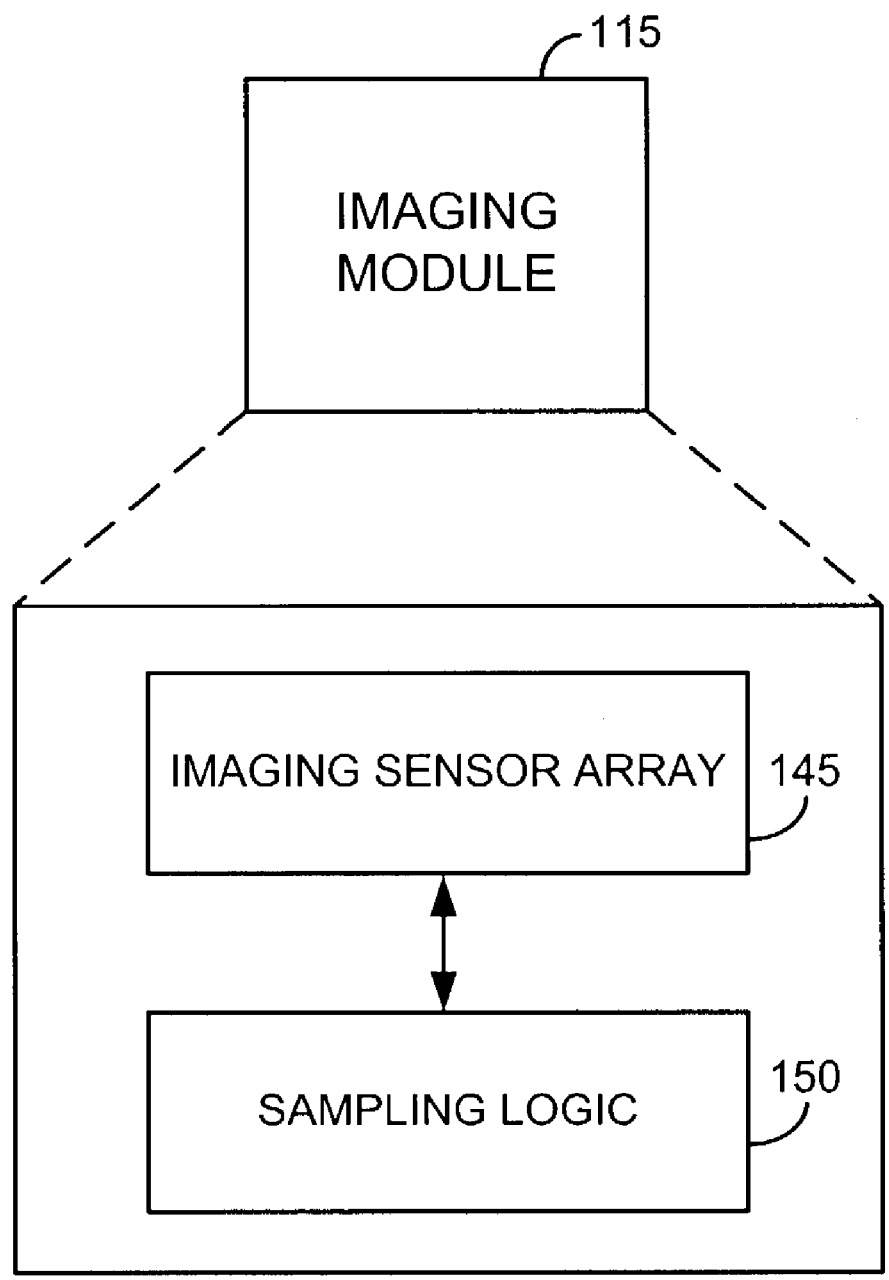

FIGS. 1A and 1B are functional block diagrams of a digital imaging device 100 in accordance with an illustrative embodiment of the invention. Digital imaging device 100 may be a digital still camera with the capability of operating in video mode, a digital camcorder, or any similar device capable of capturing digital video. In FIG. 1A, controller 105 communicates over data bus 110 with imaging module 115, memory 120, and display 125. Optical system 130 produces optical images that are converted to digital images by imaging module 115. Memory 120 may further comprise random access memory (RAM) 135 and non-volatile memory 140. Non-volatile memory 140 may be a CompactFlash™, Smart Media™, or Secure Digital™ card; magnetic tape; magnetic disk; or optical disc. As shown in FIG. 1B, imaging module 115 may further comprise an imaging sensor array 145 based on charge-coupled-device (CCD) or CMOS technology and sampling logic 150. Sampling logic 150 controls the sequence and timing of reading (sampling) imaging sensor array 145 to produce digital video. Imaging module 115 typically also includes an analog-to-digital converter (A/D), a gain control, and a digital signal processor (DSP), as is well known in the art (not shown in FIG. 1B). Display 125 may, among other things, provide a preview of the scene currently emanating from optical system 130 prior to recording, a view of what is being recorded during recording, and an on-screen user interface for controlling the operating modes and options of digital imaging device 100.

Figure 2A:
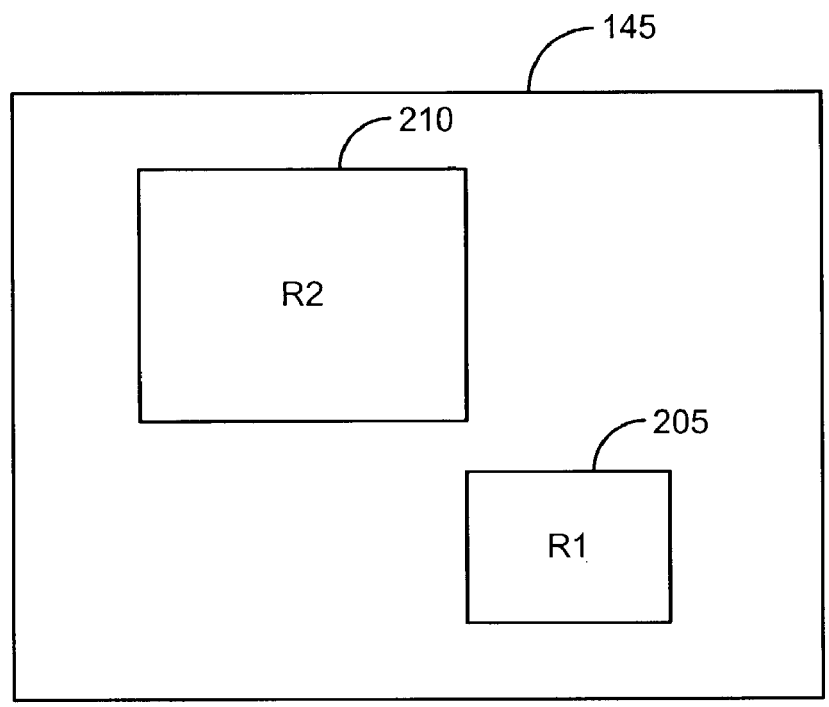
FIG. 2A is an illustration showing disjoint first and second regions of an imaging sensor array in accordance with an illustrative embodiment of the invention.
Figure 2B:
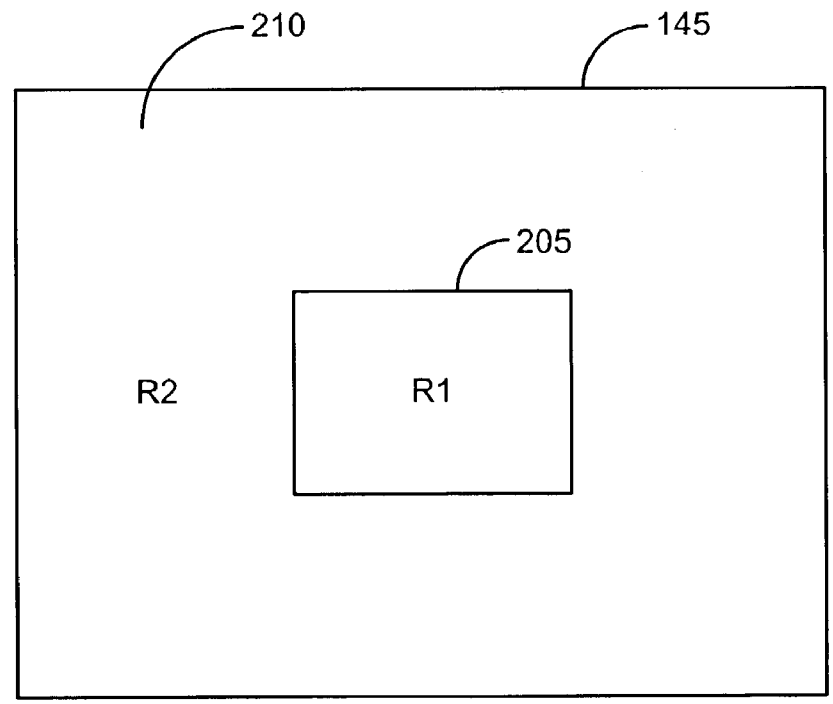
FIG. 2B is an illustration showing a first example of overlapping first and second regions of an imaging sensor array in accordance with an illustrative embodiment of the invention.
Figure 2C:
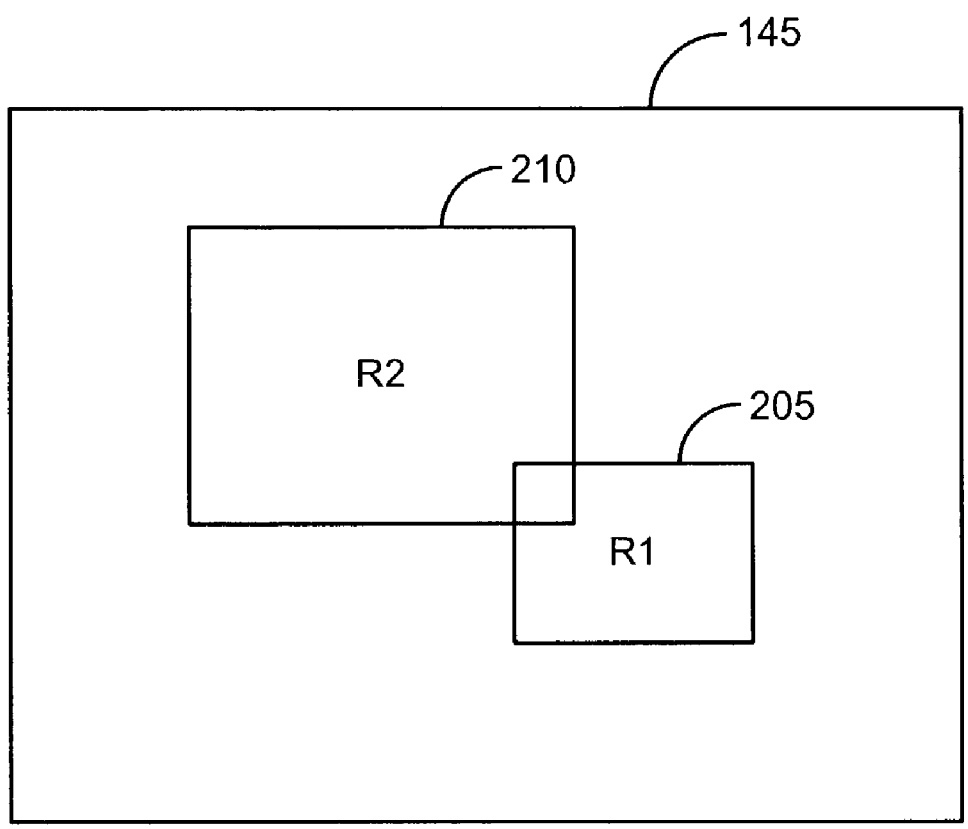
FIG. 2C is an illustration showing a second example of overlapping first and second regions of an imaging sensor array in accordance with an illustrative embodiment of the invention.

FIGS. 2A-2C are illustrations showing examples of ways in which a first region 205 and a second region 210 of a single imaging sensor array 145 may be sampled to produce two independent video streams that may be stored in memory 120. Two regions (205 and 210) are shown in FIGS. 2A-2C for simplicity. In other embodiments, more than two regions of imaging sensor array 145 may be sampled to produce more than two independent video streams. First region 205 may be sampled at a first resolution R1; second region 210, at a second resolution R2. R1 and R2 may be different or the same, depending on the application.

FIG. 2A shows an embodiment in which first region 205 and second region 210 are disjoint. FIG. 2B shows another embodiment in which first region 205 comprises a central portion of imaging sensor array 145 and second region 210 comprises a background view that spans the full dimensions of imaging sensor array 145. FIG. 2C shows yet another embodiment in which first region 205 and second region 210 partially overlap.

FIGS. 2A-2C are merely illustrative. A variety of other configurations are possible in which both a first region 205 and a second region 210 of imaging sensor array 145 are sampled and the resulting video streams are stored in memory 120.

Implementation of the invention may differ somewhat depending on whether imaging sensor array 145 is of the CCD or CMOS type. One advantage of a CMOS imaging sensor array is that sampling logic 150 may address it directly at the picture element (pixel) level, much like a RAM. However, some CMOS imaging sensor arrays may be read at a given pixel only once per exposure (destructive read).

Figure 3A:
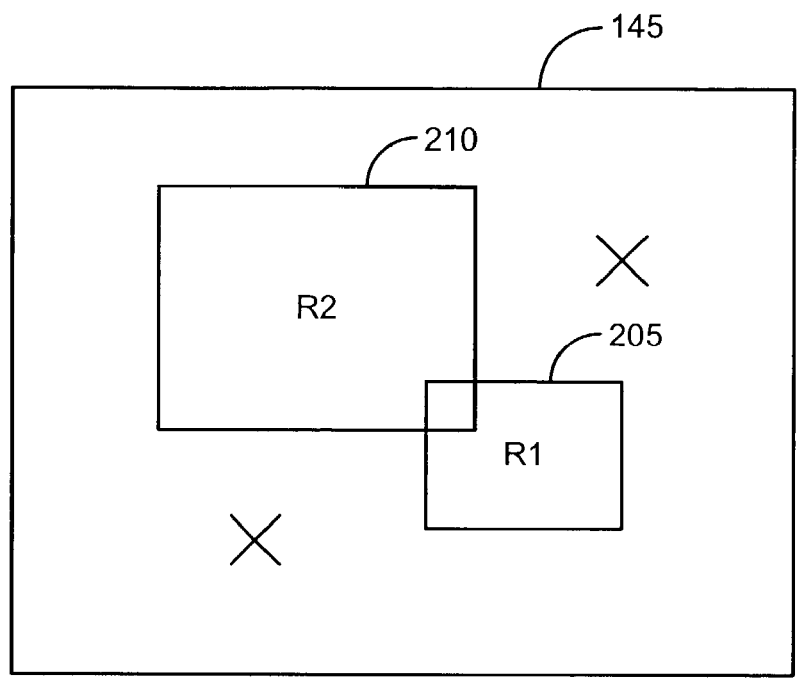
FIG. 3A is an illustration of sampling overlapping first and second regions of a CMOS imaging sensor array in accordance with an illustrative embodiment of the invention.

FIG. 3A is an illustration showing how first and second regions 205 and 210, respectively, may be sampled from a CMOS imaging sensor array 145 in a situation in which the two regions partially overlap. The portion of imaging sensor array 145 marked with "X's" may be ignored (not sampled). Within first region 205, imaging sensor array 145 may be sampled at resolution R1. Within second region 210, imaging sensor array 145 may be sampled at resolution R2. In the case of a destructive read, additional care must be taken with the overlapping portion of the two regions 205 and 210. In the example shown in FIG. 3A, R1 is assumed to be greater than R2. As those skilled in the art will recognize, a destructive read necessitates downsampling or scaling, in memory, the overlapping portion of first region 205 to produce the remainder of the video stream associated with second region 210 at (lower) resolution R2. In general, in the case of a destructive read and overlapping regions, the region to be sampled at higher resolution should be sampled before the region to be sampled at lower resolution.

Figure 3B:
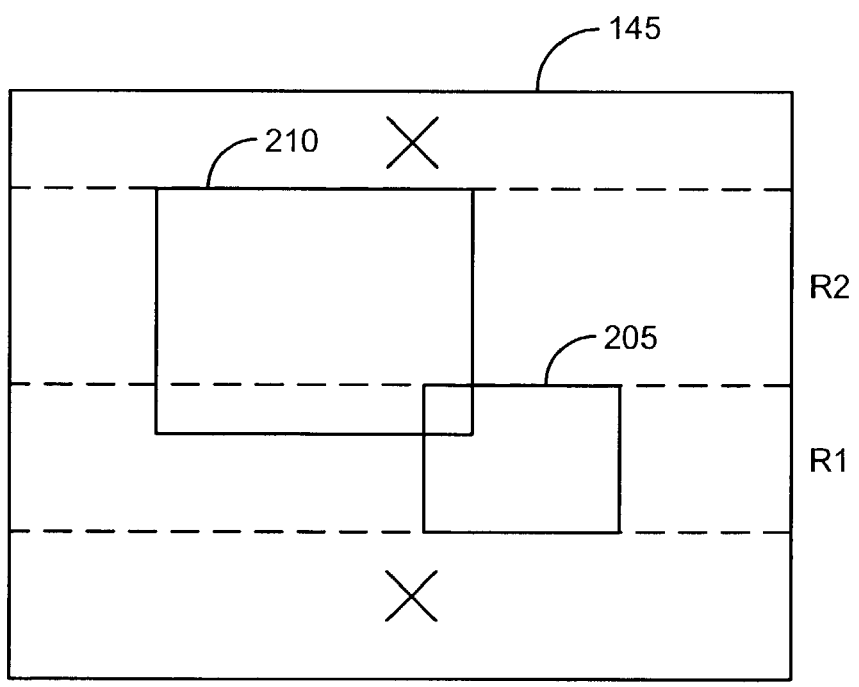
FIG. 3B is an illustration of sampling overlapping first and second regions of a CCD imaging sensor array in accordance with an illustrative embodiment of the invention.

FIG. 3B illustrates how the sampling of first region 205 and second region 210 differs if imaging sensor array 145 is a CCD. Since CCD's are typically sampled by shifting a row of sensor elements at a time into a set of horizontal shift registers (not shown in FIG. 3B) and then reading out a row of pixels in succession from the shift registers, imaging sensor array 145 may be logically divided into "strips," as shown in FIG. 3B. In this example, it is assumed that the rows of pixels are shifted downward in FIG. 3B into the set of horizontal shift registers. The top and bottom strips marked with "X's" are shifted into the set of horizontal shift registers but are skipped (not read into memory by sampling logic 150). The strip beside which "R1" has been placed in FIG. 3B may be read out at resolution R1; the strip beside which "R2" has been placed, at resolution R2, where R1 is greater than R2. The portion of the strip read out at R1 and containing a portion of second region 210 may be downsampled to produce the remainder of the video stream associated with second region 210, as explained above in connection with CMOS imaging sensor arrays. The pixels lying outside first region 205 and second region 210 in any given row of pixels may be skipped when pixels from the applicable row are read from the set of horizontal shift registers.

Figure 4:
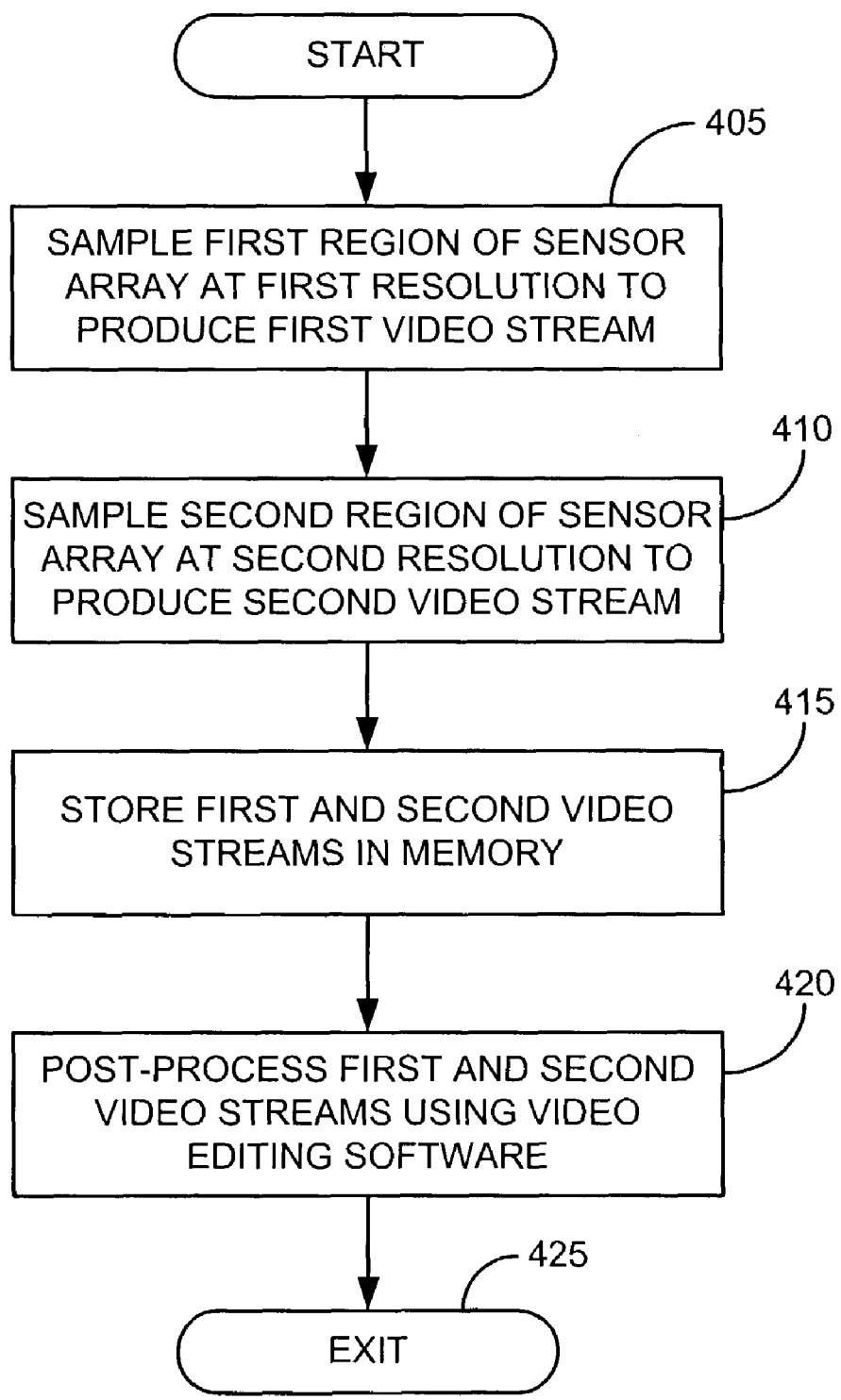
FIG. 4 is a flowchart of the operation of the digital imaging device shown in FIGS. 1A and 1B in accordance with an illustrative embodiment of the invention.

FIG. 4 is a flowchart of the operation of the digital imaging device 100 shown in FIGS. 1A and 1B in accordance with an illustrative embodiment of the invention. At 405, sampling logic 150 samples first region 205 of imaging sensor array 145 at a first resolution to produce a first video stream. At 410, sampling logic 150 samples second region 210 of imaging sensor array 145 at a second resolution to produce a second video stream. As mentioned previously, the first and second resolutions may, in some embodiments, be the same. At 415, the first and second video streams are stored in memory 120, which may, depending on the embodiment, be RAM 135 or non-volatile memory 140, or both. At optional step 420, the first and second video streams may be post-processed using suitable video editing software, as explained above. The process terminates at 425.

In some embodiments, the first and second video streams may, at 415, be stored in a single data file organized such that the two video streams are separable (separately readable). In other embodiments, the two video streams may be stored in separate data files at 415. In either case, the resulting video streams may be post-processed using suitable video editing software.

The foregoing description of the present invention has been presented for the purposes of illustration and description. It is not intended to be exhaustive or to limit the invention to the precise form disclosed, and other modifications and variations may be possible in light of the above teachings. The embodiments were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A digital imaging device, comprising:
   a hand-held camcorder for recording digital video and configured for movement by a user, the hand-held camcorder including:
   an imaging sensor array to capture digital video;
   sampling logic configured to sample a first region of the imaging sensor array at a first resolution to produce a first video stream and to sample a second region of the imaging sensor array at a second resolution to produce a second video stream, the first and second regions being different,
   where the sampling logic samples both the first region and the second region concurrently from each frame in a series of frames from the imaging sensor array; and
   a memory to store the first and second video streams.

2. The digital imaging device of claim 1, wherein for a single frame imaged by the imaging sensor, the sampling logic is configured to sample both the first region and the second region from the same single frame and to repeat the sampling for the series of frames to produce the first video stream from the samples from the first region and to produce the second video stream from the samples from the second region.

3. The digital imaging device of claim 1, wherein the first region and the second region are disjoint.

4. The digital imaging device of claim 1, wherein the first region and the second region partially overlap.

5. The digital imaging device of claim 1, wherein the first and second video streams occupy separate files in the memory.

6. The digital imaging device of claim 1, wherein the first and second video streams occupy a single file in the memory.

7. The digital imaging device of claim 1, wherein the imaging sensor array comprises a charged-coupled device.

8. The digital imaging device of claim 1, wherein the imaging sensor array comprises a CMOS device.

9. A digital imaging device comprising:
   a digital still camera for operating in a digital still image mode and a digital video mode, the digital still camera comprising:
   an imaging sensor array to capture digital video in a series of frames;
   sampling logic configured to sample a first region of the imaging sensor array at a first resolution to produce a first video stream and to sample a second region of the imaging sensor array at a second resolution to produce a second video stream, the first and second regions being different,
   where the sampling logic samples both the first region and the second region concurrently from each frame in the series of frames from the imaging sensor array; and
   a memory to store the first and second video streams.

10. The digital imaging device of claim 1, wherein the memory comprises at least one of a magnetic tape, a magnetic disk, an optical disc, a random access memory, and a flash memory.

11. The digital imaging device of claim 9, wherein the sampling logic produces the first video stream and the second video stream from the same series of frames.

12. The digital imaging device of claim 9, wherein the first region and the second region are disjoint.

13. The digital imaging device of claim 9, wherein the first region and the second region partially overlap.

14. The digital imaging device of claim 9, wherein the first and second video streams are stored in separate files.

15. The digital imaging device of claim 9, wherein the first and second video streams are stored in a single file.

16. The digital imaging device of claim 9, wherein the digital imaging device comprises a digital camcorder.

17. The digital imaging device of claim 9, further comprising:
   the first and second video streams being accessible for post-processing using video editing software.

18. The digital imaging device of claim 17, wherein the video editing software automatically can combine the first and second video streams to produce a third video stream.

19. The digital imaging device of claim 18, wherein the third video stream incorporates at least one of picture in picture, split screen, and auto fade.

20. A digital imaging device, comprising:
   a portable camcorder for recording digital video and configured for movement by a user, the portable camcorder comprising:
   means for capturing digital video in a series of frames;
   means for sampling a first region of the means for capturing digital video at a first resolution to produce a first video stream and for sampling a second region of the means for capturing digital video at a second resolution to produce a second video stream, the first and second regions being different,
   where the sampling logic samples both the first region and the second region concurrently from each frame in a series of frames from the imaging sensor array to produce the first video stream and the second video stream from the same series of frames; and
   means for storing the first and second video streams.

* * * * *